United States Patent Office 3,734,896
Patented May 22, 1973

3,734,896
CURING OF POLYURETHANE PREPOLYMERS
Tad L. Patton, Baytown, Tex., assignor to Esso
Research and Engineering Company
No Drawing. Continuation-in-part of application Ser. No. 29,657, Apr. 17, 1970. This application Oct. 28, 1971, Ser. No. 193,588
Int. Cl. C08g 22/00
U.S. Cl. 260—77.5 AM    30 Claims

ABSTRACT OF THE DISCLOSURE

This application relates to the process and products resulting therefrom of curing polyisocyanate prepolymers with either HCN, mixtures of HCN and one or more polyisocyanates or with polycyanoformamides, all in the presence of a suitable catalyst, particularly CN⁻ and tertiary amines. The resulting polymers are chain-extended through one or more heterocyclic rings, which are iminoimidazolidinediones and upon hydrolysis are converted to imidazolidinetrione rings.

RELATED APPLICATIONS

This application is a continuation in part (CIP) of: Ser. No. 29,657 filed Apr. 17, 1970, now U.S. Pat. 3,661,-859, which is a CIP of Ser. No. 808,004 filed Mar. 17, 1969, now abandoned and which was a CIP of Ser. No. 685,311 filed Nov. 24, 1967, now U.S. 3,591,562, and Ser. No. 796,143 filed Feb. 3, 1969, now U.S. 3,547,897; Ser. No. 685,288 filed Nov. 24, 1967, now U.S. Pat. 3,637,843; Ser. No. 41,656 filed May 22, 1970, now U.S. Pat. 3,635,905, which is a CIP of Ser. No. 796,221 filed Feb. 3, 1969, now abandoned, which is a CIP of Ser. No. 685,281 filed Nov. 24, 1967, now abandoned, and said Ser. No. 685,311; and Ser. No. 76,590 filed Sept. 29, 1970, now U.S. 3,684,773 which is a CIP of said Ser. No. 685,-281 and said Ser. No. 685,311.

In view of the large amount of common subject matter between these applications, the disclosures thereof are hereby incorporated in their entirety by reference, although so much will be included as is necessary to understand the invention.

BACKGROUND OF THE INVENTION

Polyurethanes are well established as commercial polymer products, and are applicable to a wide range of uses. By selecting from a wide choice of prepolymer and curing agent constituents, products of a greatly diversified nature such as elastomeric fibers, sealants, coatings, adhesives, soft and hard elastomers, thermoplastic and thermosetting plastics, and flexible or rigid foams can be produced. The properties of the various types of polyurethanes are dependent upon molecular weight, intermolecular forces, crystallinity, the stiffness of chain segments, and the degree of crosslinking. These are determined both by the choice of the "prepolymer" and of the "curing agent."

Commercially available urethane "prepolymers" are frequently prepared from hydroxyl-terminated polyethers, polyesters, graft polymers, and hydrocarbons.

The hydroxyl-terminated polyethers are prepared by the reaction of an alkylene oxide on di- or polyfunctional alcohols. The principal components of hydroxyl-terminated polyesters are dibasic acids such as adipic and phthalic and glycols, triols, and higher polyols. Increasing the polyol content in the polyesters leads to urethanes with greater rigidity, hardness, heat and chemical resistance, and lower elongation. The introduction of aromatic components into the polyester moiety increases the temperature resistance and imparts greater rigidity to the resulting polyurethane polymer.

Hydroxyl-containing graft copolymers and hydroxyl-terminated hydrocarbons such as those made from homo- and copolymers of butadiene also find use in the preparation of polyurethanes.

A dihydroxyl-terminated polymer may be schematically represented as follows:

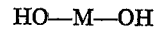

where M is the polyether, polyester, or hydrocarbon chain. The main chain flexibility and other properties of the hydroxyl-terminated polymers are determined by the structure of the repeating units. For instance, a linear aliphatic polyether chain is more flexible than an aliphatic polyester chain. Inclusion of cyclic or aromatic moieties in the hydroxyl-terminated polymers reduces their flexibility; the flexibility or rigidity of mixed alkylaryl polyethers or polyesters will be determined largely by the ratio of aromatic to aliphatic groups, and the nature of the cyclic or aromatic moieties in the polymer chain.

A "prepolymer" is prepared from a hydroxyl-terminated polymer by reacting the hydroxyl groups (e.g., both of the hydroxyl groups in the example above given) with a diisocyanate:

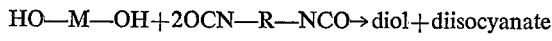
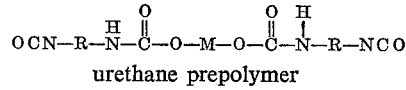
urethane prepolymer

It will be seen that the organic moiety R of the diisocyanate can be any of alkyl, aryl or aralkyl, or combination thereof.

The resulting isocyanate terminated prepolymer is then reacted with a suitable "curing agent" in order to obtain the final polyurethane product. Other additives such as foaming agents, fillers, surfactants, etc., may also be added to modify the physical characteristics and properties of the product.

Formation of a polymer product using a typical diamine curing agent may be generalized as follows:

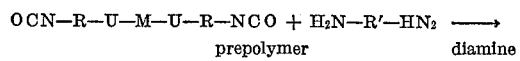
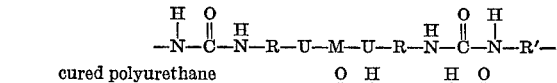

M is the organic moiety of the hydroxyl-terminated polymer
R is the organic moiety of the diisocyanate, and
R' is the organic moiety of the diamine.

Other curing agents used in place of diamines include glycols, polyols, water, compounds containing 2 or more mercapto groups and the like.

The rigidity of the blocks between the polyether or polyester blocks is dependent on the structure of the polyol and the diiocyanate used to prepare the prepolymer and on the structure of the curing agent. The diamine curing agent introduces a urea linkage, which is flexible. Maximum rigidity of this block will be realized when the diisocyanate and curing agent have rigid moieties, R and R', which are aromatic. Even in these instances the relatively high degree of free rotation in the linear urethane and urea linkages contributes flexibility to these blocks so that maximum rigidity per unit block is not realized.

SUMMARY OF THE INVENTION

Novel chain-extended polymers with heterocyclic ring linkages are obtained by a new curing process in which polyisocyanate containing prepolymers are cured by reacting with any of the following or combinations thereof:

(1) HCN+catalyst
(2) HCN+disocyanate or polyisocyanate+catalyst
(3) Cyanoformamides (having two or more cyano formamide groups)+catalyst.

In a preferred embodiment said prepolymers contain urethane groups and are standard polyurethane prepolymers.

The heterocyclic linkages are imidazolidine rings and have the general structure:

$$\begin{array}{c} O \\ \parallel \\ C \\ -N \diagup \diagdown N- \\ | \qquad | \\ Y=C\text{——}C=X \end{array}$$

wherein X and Y are either =O or =NH, but are never both =NH.

DETAILED DESCRIPTION OF THE INVENTION

It has been discovered and forms the substance of this invention that molecules usually called prepolymers having 2 or more isocyanate groups (—NCO) can be cured with HCN and/or HCN derivatives such as cyanoformamides in the presence of a suitable catalyst to form polymers having heterocyclic linking units. These links are characterized by a heterocyclic ring of the nature:

$$\begin{array}{c} O \\ \parallel \\ C \\ -N \diagup \diagdown N- \\ | \qquad | \\ Y=C\text{——}C=X \end{array}$$

wherein X and Y are either =O or =NH but X and Y are never both =NH.

The ring structure described above is an essential component in the connecting block between a series of chains which may be linear or branched or cross-linked.

It has been further discovered and forms a specific feature of this invention that a special subgenus of the above-described process and resulting polymers are those in which the repeating units not only contain urethane linkages but also are derived from prepolymers containing 3 or more isocyanate groups. The use of more than 2 isocyanate groups per chain unit enables one to modify the resulting rigidity of the polymer through either branching of cross-linking.

While the following description and schematic illustrations are frequently couched in terms of diisocyanate-terminated, urethane-containing precursors or prepolymers, it is to be understood that the scope of the invention includes: (a) precursors or prepolymers which have 3 or more isocyanate groups and contain no urethane components and (b) urethane containing precursors which have 2 or more isocyanate groups.

In situations (a) and (b) above, preferably at least two of the isocyanate groups are in terminal positions on the precursor molecule, but this is not always essential.

Thus the invention contemplates within its scope a unique process whereby curing of polyisocyanate-containing molecules, such as but not limited to urethane prepolymers, is effected by treating such prepolymers with a reagent selected from the group consisting of:

(1) HCN+catalyst
(2) HCN+polyisocyanate+catalyst
(3) Cyanoformamide having two or more cyanoforamide group+catalyst
(4) Any combination of or all of the foregoing.

The isocyanates used in this invention are defined as polyisocyanates which are compounds having from 2 to 15 preferably 2 to 10 and most preferably 2 to 5 isocyanate groups per polymer chain. When 3 or more NCO groups are present per polymer chain, this will result in cross-linking or branching regardless of their position on the polyisocyanate.

The isocyanate prepolymer can be made from any polymer molecule having 2 or more active hydrogen atoms which can react with diisocyanates to form a prepolymer having at least two isocyanate groups. Examples of compounds containing such active hydrogen atoms are glycols, polyols, alcohols, phenols, thiols, amines, amides and carboxylic acids.

The best-known and most commonly used species of hydrogen-active compounds are glycols and polyols. The prepolymer prepared from a polyol contains polyurethane linkages.

For convenience, the specific embodiments of the invention set forth and described herein will be urethanes, but the invention is not so limited.

In general, the prepolymer will have a molecular weight of about 300 to 10,000, preferably 1000 to 7500, and most preferably 1200 to 6,000.

The backbone of the prepolymer can be polyether, polyester, polyolefin, e.g. ethylenepropylene copolymer, polyisobutylene, polybutadiene, polyisoprene, styrene-butadiene copolymer and the like. But other suitable backbone materials can be used.

Where compatible, mixtures in various proportions of the curing agent of this invention with themselves and with other conventional curing agents are a feature of the invention.

The reaction of HCN with an isocyanate prepolymer in the presence of a suitable catalyst is illustrated as follows:

$$\ldots R''\text{—NCO} + HCN \xrightarrow[\text{e.g. }t\text{-amine}]{\text{catalysts}} \ldots R''\text{—}\underset{H}{N}\text{—}\underset{\parallel}{\overset{O}{C}}\text{—CN}$$

polyisocyanate-   hydrogen   (poly) cyanoformamide
terminated   cyanide
prepolymer where R'' is —R—U—M—U—R— as hereinabove defined. The resulting cyanoformamide will react further with another isocyanate group on the isocyanate-containing prepolymer:

$$\ldots R''\underset{H}{N}\text{—}\overset{O}{\underset{\parallel}{C}}\text{—CN} + \ldots R''\text{NCO} \xrightarrow{\text{catalyst}}$$

cyanoformamide   isocyanate-containing prepolymer $$\begin{array}{c} O \\ \parallel \\ C \qquad H \\ \diagup \diagdown \diagup \\ \ldots R''\text{—}N \qquad N\text{—}R'' \ldots \\ | \qquad | \\ O\!\!\equiv\!\!C\text{——}C\!\!\equiv\!\!N \end{array}$$

cyanoformyl urea (Note: Although the above reaction sequence shows only one end of the prepolymer or cyanoformamide, the same reaction sequence will also occur at the other ends).

The resulting cyanoformyl urea groups cyclize in the presence of a suitable catalyst (which can be the same as the initial catalyst):

$$\begin{array}{c} O \\ \parallel \\ C \qquad H \\ \diagup \diagdown \diagup \\ \ldots R''\text{—}N \qquad N\text{—}R''\ldots \\ | \qquad | \\ C\text{——}C \\ \parallel \qquad \parallel \\ O \qquad N \end{array} \xrightarrow[\text{e.g. }t\text{-amine}]{\text{catalyst}} \begin{array}{c} O \\ \parallel \\ C \\ \diagup \diagdown \\ \ldots R''\text{—}N \qquad N\text{—}R'' \\ | \qquad | \\ C\text{——}C \\ \parallel \qquad \parallel \\ O \qquad NH \end{array}$$

cyanoformyl urea   iminoimidazolidinedione linkage

Using hydrogen cyanide, the foregoing reaction sequence can be carried out in successive, but substantially simultaneous, steps. Using hydrogen cyanide, the repeating unit in the urethane polymer may be expressed as having the structure

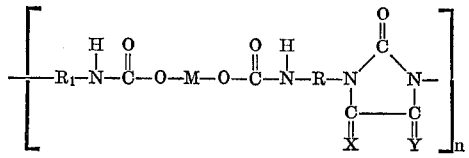

where:

M is the polyether or polyester moiety from which the propolymer was derived, and preferably has a molecular weight of 1200 to 5,000;

$R_1$ is the organic nucleus of the diisocyanate used to form the prepolymer; and X and Y are either O or NH, but X and Y are not both NH.

Alternatively, a polycyanoformamide may first be separately formed from a prepolymer and later reacted with a di- or polyisocyanate containing prepolymer to form the finished polymer. In either event, the resulting product, e.g. polyurethane, will exhibit the substituted-1,3-imidazolidine-1,3-diyl linkage as above explained. The polyurethanes may cross-link during curing by reaction of isocyanate groups with the imino (=NH) groups.

Thus it is seen that the present invention allows polyurethane or other polyisocyanate-containing prepolymers to be cured with hydrogen cyanide, using an active catalyst, to form the imidazolidine linkage from the isocyanate terminal groups of the prepolymers.

Also, prepolymers can be cured by reaction with a dicyanoformamide, which can be obtained from a diisocyanate different from the prepolymer or it can be formed by reaction of HCN with the diisocyanate groups on the prepolymer. An active catalyst is also required when cyanoformamide curing is employed.

It is also feasible to use an admixture of cyanoformamides with other isocyanates or mixtures of the isocyanate containing prepolymers with other diisocyanates, for curing with HCN and/or with di- or polycyanoformamides and an active catalyst so as to introduce modifications into the polyurethane product.

Although dicyanoformamides are the preferred curing agent component, polycyanoformamides having up to 15 cyano groups can be used.

To increase the stability of the heterocyclic ring, the imino group on the imidazolidine ring may be replaced by an oxygen atom via hydrolysis with an aqueous mineral acid such as hydrochloric acid or sulfuric acid. A suitable technique for such hydrolysis is described in copending commonly assigned application Ser. No. 29,657, now U.S. 3,661,859 which is hereby incorporated in its entirety. The resulting structure of the imidazolidine ring after such hydrolysis is:

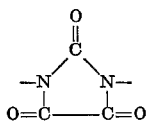

THE POLYURETHANE PREPOLYMER

Among the reactive organic polyfunctional polyols employed in preparing one class of polyurethane resins used in the practice of the invention by reaction with a suitable isocyanate compound are the polyalkylene ether, thioether, and ether-thioether glycols represented by the general formula:

wherein R represents the same or different alkylene radicals containing up to about 10 carbon atoms, X represents oxygen or sulfur, and $n$ is an integer large enough so that the molecular weight of the polyalkylene ether, thioether, or ether-thioether glycol is at least about 500, e.g., from about 500 to about 10,000. The polyalkylene ether glycols included within this general formula, such as polyethylene glycols, polypropylene glycols, polybutylene glycols, polytetramethylene glycols, polyhexamethylene glycols, and the like, which are obtained, for example, by acid-catalyzed condensation of the corresponding monomeric glycols or by the condensation of lower alkylene oxides, such as ethylene oxide, propylene oxide, and the like, either with themselves or with glycols such as ethylene glycol, propylene glycol, and the like are preferred.

Polyalkylenearylene ether, thioether and ether-thioether glycols which also have molecular weights ranging from about 500 to about 10,000 but which differ from the above-described polyalkylene glycols in having arylene radicals, such as phenylene, naphthylene and anthrylene radicals, either unsubstituted or substituted, e.g., with alkyl or aryl groups, and the like, in place of some of the alkylene radicals of said polyalkylene glycols may also be employed as polyol reactants. Polyalkylenearylene glycols of the type ordinarily used for this purpose will usually contain at least one alkylene ether radical having a molecular weight of about 500 for each arylene radical present.

Essentially linear polyesters containing a plurality of isocyanate-reactive hydroxyl groups constitute another class of reactive organic polyfunctional polyols which may be employed in preparing polyurethane resins useful in the practice of the present invention. While the preparation of polyesters suitable for this purpose has been described in great detail in the prior art, and forms no part of the present invention per se, it may be mentioned here by way of illustration that polyesters of this type may be prepared by the condensation of a polyhydric alcohol, generally a saturated aliphatic diol such as ethylene glycol, propanediol-1,2, propanediol-1,3, butanediol-1,3, butanediol-1,4 pentanediol-1,2, pentanediol-1,5, hexanediol-1,3, hexanediol-1,6 diethylene glycol dipropylene glycol, triethylene glycol, tetraethylene glycol, and the like, as well as mixtures of such diols with each other and with minor amounts of polyols having more than two hydroxyl groups, preferably saturated aliphatic polyols such as glycerol, trimethylol ethane, trimethylol propane, pentaerythritol, sorbitol, and the like, with a polycarboxylic acid or anhydride, generally a dicarboxylic acid or anhydride which is either saturated or which contains only benzenoid unsaturation, such as oxalic, malonic, succinic, glutaric, adipic, pimelic, suberic, azelaic, sebacic, malic, phthalic, cyclohexanedicarboxylic, and endomethylenetetrahydrophthalic acids, and the like and their isomers, homologs, and other substituted derivatives, e.g. chloroderivatives, or with mixtures of such acids with each other and with unsaturated dicarboxylic acids or anhydrides such as maleic, fumaric, citraconic, and itaconic acids, and the like, as well as with polycarboxylic acids containing three or more carboxyl groups such as aconitic acid and the like.

The essentially linear polyesters commonly used in preparing polyurethane resins preferably have molecular weights ranging from about 750 to about 3,000. In addition, they will generally have relatively low acid numbers, e.g., acid numbers not appreciably in excess of about 60 and preferably as low as can be practicably obtained, e.g., 2 or less. Correspondingly, they will generally have relatively high hydroxy numbers, e.g., from about 30 to about 700. When preparing these polyesters, an excess of polyol over polycarboxylic acid is generally used to insure that the resulting essentially linear polyester chains contain a sufficient amount of reactive hydroxyl groups.

Another class of suitable organic polyfunctional polyol reactants includes polyalkylene ether polyols containing more than two reactive hydroxyl groups such as polyalkylene ether triols tetrols, and the like, which are prepared, for example, by reacting polyols such as glycerol, trimethylol ethane, trimethylol propane, pentaerythritol, dipentaerythritol, sorbitol, and the like, with lower alkylene oxides such as ethylene oxide, propylene oxide, and the like.

Nitrogen-containing polyfunctional polyols may also be used as polyol reactants. Among such materials there are included the polyesteramides conventionally employed in the preparation of polyurethane resins, i.e. those having molecular weights ranging from about 750 to about 3,000, acid numbers ranging from about 60 as a maximum to as low as can be practicably obtained, e.g. 2 or less, and hydroxyl numbers ranging from about 30 to about 700, and also high molecular weight polyamino alcohols, such as hydroxypropylated alkylene diamines of the general formula

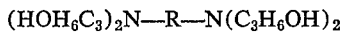
$$(HOH_6C_3)_2N-R-N(C_3H_6OH)_2$$

wherein R represents an alkylene radical having from 2 to 6 carbon atoms, inclusive of which, N,N,N',N'-tetrakis-(2-hydroxypropyl)-ethylenediamine is a representative species, as well as higher analogs thereof, such as hydroxypropylated polyalkylenepolyamines of the general formula

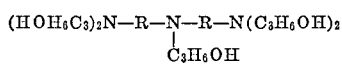
$$(HOH_6C_3)_2N-R-\underset{\underset{C_3H_6OH}{|}}{N}-R-N(C_3H_6OH)_2$$

wherein R is is as defined hereinabove (see U.S. Pat. No. 2,697,118 to Lundsted et al.).

As can be readily appreciated, mixtures of the various reactive organic polyfunctional polyols described hereinabove may also be employed in preparing polyurethane resins useful in the practice of the present invention.

A wide variety of organic polyisocyanates can be used among which there are included aromatic disocyanates, such as m-phenylenediisocyanate, p-phenylenediisocyanate, 4-t-butyl-m-phenylenediisocyanate, 4-methoxy-m-phenylenediisocyanate, 4-phenoxy-m-phenylenediisocyanate, 4-chloro-m-phenylenediisocyanate, toluenediisocyanates (either as a mixture of isomers, e.g. the commercially available mixture of 80% 2,4-toluenediisocyanate and 20% 2,6-toluenediisocyanate, or as the individual isomers themselves), 4,4'-diphenylmethane diisocyanate, aliphatic diisocyanates, such as methylenediisocyanate, ethylenediisocyanate, the tri-, tetra-, penta-, hexa-, hepta-, oct-, non- and decamethylene-$\omega,\omega'$-diisocyanates, 2-chlorotrimethylenediisocyanate, 2,3-dimethyltetramethylenediisocyanate, and the like, and tri- and higher isocyanates, such as benzene-1,3,5-triisocyanate, toluene-2,4,6-triisocyanate, diphenyl-2,4,4'-triisocyanate, triphenylmethane-4,4',4''-triisocyanate, and the like. Mixtures of two or more of such organic polyisocyanates may also be employed to prepare the polyurethane resins by reaction with the ethers and esters described above utilizing procedures well known to those skilled in the art, see for example, U.S. Pats. 2,729,618, 3,016,364 and the like.

These isocyanates can also be used to form the cyanoformamides of the invention. The "pro-polymer" technique, is commonly practiced in the production of polyurethane prepolymers. A typical preparation involves mixing polyol and polyisocyanate under substantially anhydrous conditions, i.e., with usually not more than about 0.2% by weight of water, based on the total weight of the mixture, being present, and with a molar excess of the polyisocyanate over the polyol usually being employed, reacting this mixture at a temperature ranging from about room temperature to about 100° C. for from about 20 minutes to about 8 hours, and then cooling the resulting "pre-polymer" to a temperature of from about room temperature to about 60° C.

Furthermore, particulate or fibrous fillers, such as chopped α-cellulose, asbestos or glass fibers, and the like, conventional fire-retarding additives, for example, phosphates such as triphenyl phosphate, tricresyl phosphate, tris(2,3-dibromopropyl) phosphate, tris(β-chloroethyl) phosphate, and the like, dyes or pigments, e.g., silica pigments, stabilizers, etc., may be present in the polyurethanes.

Specific polyurethane prepolymers

Prepolymers are commercially available as such; for example, Formrez P-410 is a polyester-type prepolymer having 4.0-4.3% free isocyanate groups; it is obtained from Witco Chemical Company.

Another commercial prepolymer is Adiprene L-100 obtained from Du Pont and comprising a fully saturated liquid urethane prepolymer having 4.1% free isocyanate groups. Further, prepolymers may be prepared from commercially available polyhydroxyl containing polyethers, with at least 2 hydroxyl groups in a terminal position. More than 2 hydroxyl groups can be present, if desired, in order to enhance the production of cross-linked products, particularly urethanes which have greater stiffness and rigidity.

A working example of the preparation of a prepolymer is given in Example 1 of this application, wherein a propylene oxide polyether obtained commercially (PPG-2025 polyol) having from 28 to 30 propylene oxide groups per molecule is reacted with a diisocyanate so as to form a prepolymer. All of this is well known in the prior art and forms no portion of the present invention.

The dicyanoformamides

The preparation of dicyanoformamides is disclosed in detail and claimed in the above-mentioned Ser. No. 685,288, now U.S. 3,637,843 and U.S. 3,391,562.

Polycyanoformamides have the following structure.

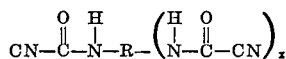
$$CN-\underset{\underset{}{\overset{O}{\|}}}{C}-\underset{\underset{}{\overset{H}{|}}}{N}-R-\left(\underset{\underset{}{\overset{H}{|}}}{N}-\underset{\underset{}{\overset{O}{\|}}}{C}-CN\right)_x$$

wherein $x$ is 1-3 and R is an organic moiety which can be any of aromatic or aliphatic or aromatic/aliphatic (chains including polyethers and polyesters) and substituted with functional groups such as alkoxy, ester, etc., so long as they do not have active hydrogen atoms.

Dicyanoformamides (wherein $x$ is 1) are preferred.

The molecular weight of R will range from 40 to 2,000, preferably 80 to 1150, and most preferably 100 to 500.

The crux of the synthesis is the discovery of the criticality of the particular catalyst used. Thus, a special, narrowly defined catalyst is used, which must satisfy certain boundary criteria.

These are: one does not want to drive the initial reaction to completion, i.e. polymer would result. One does not want to have a catalyst of such innocuousness that there would only be a very slow reaction. One must also keep in mind the difference in reactivity between the aliphatic isocyanates and the aromatic isocyanates. The aromatic isocyanates are about ten to a hundred-fold more active than the aliphatic ones. Thus the danger and the possibility of driving the reaction of hydrogen cyanide with an aromatic diisocyanate to completion as a polymer is much greater than when one is dealing with aliphatic diisocyanates.

The specific unique, highly prefered catalysts of the invention are generally rather ineffective with aliphatic isocyanates since they do not have the requisite threshhold potential to be activated by the catalysts of the invention.

The catalyst of the invention must generally comply with the following criteria in order to effectively operate according to the thrust of this invention. The necessary characteristics are:

(a) it cannot have active hydrogens;
(b) it must be a basic compound;
(c) the basicity is defined as being no greater than a $K_b$ of $1 \times 10^{-8}$ and preferably no greater than $K_b$ of $1 \times 10^{-10}$; and (d) the catalytic activity must be insufficient to form polymers at normal reaction temperatures.

Particularly preferred subgenus of compounds which will satisfy these criteria are:

(1) 2,6-dialkylpyridines having the following formula

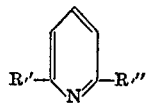

and N,N-dialkylanilines having the following formula.

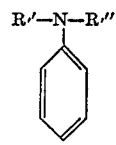

Wherein the foregoing schematic formula R' and R" are $C_1-C_{15}$, preferably for the pyridine $C_3-C_{10}$, and most preferably $C_3-C_6$ and for the aniline preferably $C_2-C_{10}$, preferably $C_2-C_6$ aliphatic groups. Both $R_1'$ and $R_1"$ can be the same or different within the limitations described above. Furthermore, either R' or R" can be cyclohexyl groups.

It is to be noted that 2,6-lutidine, N,N-dimethylaniline, 2,6-diethylpyridine are also specially preferred species but are described and claimed in the parent application.

Additional preferred species which are preferred for the particular embodiment of the invention disclosed herein are N,N-diethylaniline, N,N-dipropylaniline, N-methyl-N-propylaniline, N - cyclohexyl-N-methylaniline, 2,6-dipropylpyridine, 2-ethyl-6-propylpyridine, 2-methyl-6-ethylpyridine and the like. In both of the above instances the invention contemplates ring-substituted pyridines and anilines both on the alkyl substituents and on the ring so long as in the case of aniline the substituents are only on the 3, 4 and/or 5 positions on the ring; N,N-diethyl p-toluidine is an example.

It is to be emphasized that these specific hindered catalysts of requisite basicity are to be used preferably in combination with diisocyanates having aromatic moieties. If used with aliphatic diisocyanates, the catalysts are not active enough to generate any reactions within a practical period of time. But since the aromatic diisocyanates are so much more active than the aliphatic ones, the particularly described catalysts of the invention are effective to drive the reaction toward the formation of dicyanoformamides but not so active as to catalyze their reaction with free isocyanate groups.

Criteria for selecting prepolymer and cyanoformamide

Very generally speaking the prepolymer is relatively long-chained and the cyanoformamide is of relatively low molecular weight and predominately aromatic in nature.

In some instances the organic moiety of the prepolymer and that of the cyanoformamide will be the same. That choice can be made depending on the particular characteristics of the final material.

Catalyst

The catalyst employed in the present invention must be active not only in forming the initial reaction product (a cyanoformylurea linkage) between the diisocyanate-terminated prepolymer and HCN or dicyanoformamides, but also it must be active in cyclizing it to the iminoimidazolidinedione ring.

Among those catalysts known to have the requisite activity are non sterically hindered tertiary amines, organo tin compounds, organo phosphorous compounds and organo lead compounds. Tertiary amines suitably have no active hydrogen atoms and include such compounds such as triethylamine, triethylenediamine, 1-aza-3,3,7,7-tetramethylbicyclo(3.3.0)-octane, 1-methylpiperidine, and the like. Phosphorous compounds include triphenyl phosphine, tributyl phosphine, etc. Tin compounds include dibutyl tin dilaurate, dibutyl tin diacetate. Lead compounds include trimethyl plumbyl acetate and 1-(tri-n-butyl plumbyl) imidazole. The inorganic cyanide ion ($CN^-$) is also an active catalyst; thus solutions of the alkali metal and alkaline earth cyanides, such as sodium cyanide, calcium cyanide, potassium cyanide, lithium cyanide, etc., in a suitable solvent are also particularly useful as catalysts.

The catalyst is used in any amount found effective and efficient; usually this will range from 0.01 to 2 mol percent per mol of isocyanate in the prepolymer. Preferably about 0.05–0.2, most preferably 0.075 to 0.15 mol percent will be employed. See Ser. No. 41,656, now U.S. 3,635,905 for a detailed description of the catalyst.

It is quite probable that other catalysts now unknown will be found to be effective. These are included as functional equivalents even though not specifically disclosed.

Solvents

The curing step may be carried out with or without the use of solvents. Suitable solvents to be used in extending prepolymers according to the present invention are those in which the reaction products as well as the starting materials (the prepolymer, the added diisocyanate (if any), the di- and/or polycyanoformamides, the HCN, and the catalyst) are soluble.

The dipolar aprotic solvents such as dimethylformamide, N-methylpyrrolidone, dimethylacetamide, dimethylsulfoxide, hexamethylphosphoramide, and other structurally related solvents are preferred. However, aromatic solvents such as benzene, toluene, xylene, chlorobenzene, and the like may be suitable.

The choice of solvent may be important in certain instances, since the molecular weight of the polymer formed may be limited by its solubility in the solvent used at the reaction temperatures employed. Other solvents such as nitrobenzene and acetonitrile can be used alone or in admixture with the dipolar aprotic solvents. The particular solvent can easily be chosen by those skilled in the art.

Anhydrous solvents are preferably used unless foaming is desired.

Reaction conditions

The curing of precursors containing isocyanate groups, particularly isocyanate-terminated polyurethane prepolymers with hydrogen cyanide is normally carried out under ambient pressure and anhydrous conditions. Cooling may be required because the reaction is exothermic, and the reaction should be carried out at ambient pressures within the temperature range of about 10 to about 125° C., preferably from 10–75° C., most preferably 25 to 75° C. Pressure equipment may be necessary due to the volatility of hydrogen cyanide (B.P. 25° C.). The reaction can be carried out at lower temperatures with decreased rates of reaction as well as at higher temperatures if desired. The reaction is preferably carried out under a blanket of inert gas such as nitrogen so as to exclude oxygen, since hydrogen cyanide forms explosive mixture with oxygen and/or air.

Where hydrogen cyanide is not employed, but a cyanoformamide is used, the reaction may be carried out at the same temperatures disclosed above, i.e. at temperatures between 10 and 125° C., etc. The use of elevated temperatures is possible without utilizing pressure equipment, since HCN is not present. Further, it is not necessary to eliminate oxygen from the reaction vessel; however, preferably an inert atmosphere such as nitrogen may be used.

Polymers prepared in solution may be hydrolyzed with mineral acids before they are isolated. See Ser. No. 29,657, now U.S. 3,661,859 for details on such hydrolysis.

Workup of the final product will depend upon the process chosen and of the product itself. Workup steps may include removing the polymer from a mold or precipitating the product from solution, which are well known in the art. In general, polyurethane polymers cured according to this invention are susceptible to the same processing procedures as polyurethane polymers produced by the use of conventional curing agents.

EXAMPLES

The following examples illustrate various aspects of the present invention. All references to mols are in terms of gram-mols.

Example 1—Preparation of prepoylmer

An admixture of 0.12 mol of MDI (4,4'-diphenylmethane diisocyanate:

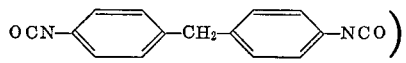

and 0.05 mol of PPG Polyol (a propylene oxide polyether having from 28 to 30 propylene oxide groups per molecule) was reacted at about 120° C. for 1 hour and at 10 mm. of Hg. pressure. The resultant prepolymer was a viscous liquid having an isocyanate equivalent of 850. Unreacted MDI was not separated from the product.

Example 2—Preparation of a dicyanoformamide

A solution of 34 grams (1.25 mols) of dry HCN, 12 grams of 2,6-lutidine, and 130 grams of toluene was added to a solution of 80 grams (0.32 mol) of 4,4'-diphenylmethane diisocyanate in 300 mls. of dry toluene at 5° C. The solution was allowed to warm slowly to room temperature and an insoluble product was collected on a filter. The infrared spectrum of the product exhibited absorption maxima at 3.05 and 5.90 microns. The product was analyzed and determined to have a structure as follows:

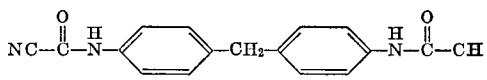

This was given the shortened designation MDI·2HCN and will be referred to as such in the other examples herein.

Example 3—Curing of prepolymer of Example 1 with MDI·2HCN adduct of Example 2

A solution of 42.5 grams of the prepolymer (0.05 mol NCO) from Example 1 in 25 ml. of NMP (N-methylpyrrolidone) was reacted with 0.02 mol of MDI·2HCN. The reaction was carried out at atmospheric pressure and at 40° C. for about 30 minutes in the presence of 1 gm. of triethylamine catalyst. A solid plug of polymer formed. It was redissolved in hot butanone and precipitated in methanol. The product formed a thin film when subjected to 400° F. and 10 tons pressure. The film was elastic. The polyurethane product had a repeating unit represented by the formula:

This example illustrates the production of a polyurethane product while utilizing a cyanoformamide derived from the same diisocyanate as was used in forming the prepolymer. Obviously, different diisocyanates could also be employed.

Example 4—Curing of prepolymer with MDI·2HCN

A solution of 0.032 mol of the prepolymer from Example 1 and 0.032 mol of MDI·2HCN was prepared in 135 ml. of solvent (125 ml. 4-methyl-2-pentanone and 10 ml. NMP). Two grams of triethylamine were added. The temperature increased from the original 25° C. to 30° C. and the reaction was complete in 20 minutes. The product was precipitated by pouring the solution into an excess of methanol. The product was moderately cross-linked, and had the general structure given in Example 3, and showed $\lambda_{max}$ values at 3.10, 5.52, 5.70 and 5.92$\mu$ when subjected to infrared analysis.

Part of the product was redissolved in formic acid. Then a methanolic solution of HCl was added to hydrolyze and break the cross-linked bonds. The resulting thick solution was poured into water to precipitate a rubbery mass. It was suspended in boiling methanol and filtered to give a light colored product A. The filtrate was poured into water to precipitate a lower molecular weight polymer B. These products had the following properties:

| | A | B |
|---|---|---|
| Tensile strength (break), p.s.i.g. | 4,200 | 1,600 |
| Elongation at break, percent | 500 | 500 |

This example illustrated the preparation of a strong elastomeric polyurethane by the present invention.

Example 5—Curing of prepolymer with MDI and MDI·2HCN

A portion of the prepolymer of Example 1 was cured as follows.

A solution of 17.04 g. (0.01 mol) of the prepolymer of Example 1, 15.2 g. (0.05 mol) of MDI·2HCN, and 10 g. (0.04 mol) of MDI was prepared in 50 ml. of NMP at 25° C. To the solution were added 2 ml. of triethylamine. The product "gelled" upon addition of the triethylamine catalyst. It was separated from the liquid, broken and heated in methanol. A yield of 34 g. of brown resin was obtained. When compression molded in a press at 400° F. and 20 tons pressure, a film was obtained having a tensile strength (at break) of 2400 p.s.i. and an elongation (at break) of 30%. The product had the following general structural formula:

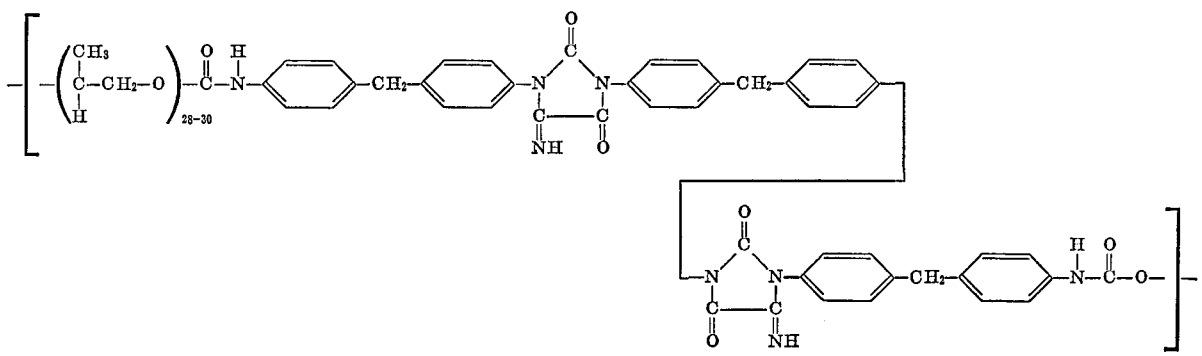

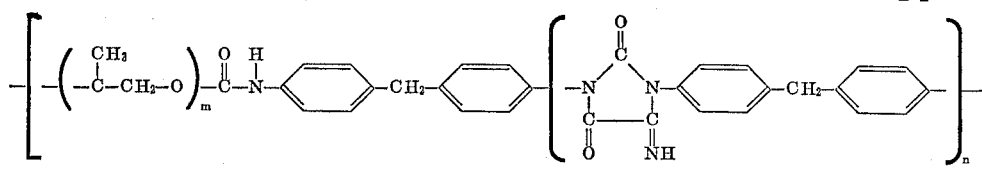
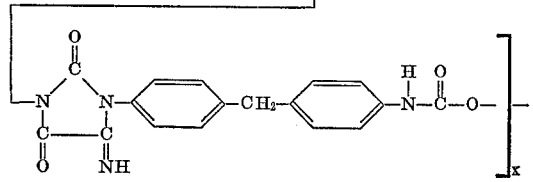

where
m=28–30
n=10 (average)
x=1 to 4

From the above formula it can be seen that there is an average of 10 repeating heterocyclic units as a block portion of the polyurethane product. This block adds substantially to stiffness of the product, as is seen by comparing the elongation (500%) with that of the product in Example 4 where no additional diisocyanate was employed.

Example 6—Preparation of prepolymer having an isocyanate equivalent of 3939

The PPG–2025 polyol and MDI described in Example 1 were also used in this example, but the molar ratio of —NCO to —OH was 1.25 rather than 2.4 as in Example 1. Except as otherwise indicated, the reaction conditions were the same as for Example 1. The reaction was carried out at about 120° C. for about 10 minutes to obtain a prepolymer containing 1.06 weight percent NCO groups. The isocyanate equivalent was 3939 (as compared to 850 in Example 1).

Isocyanate Equivalent $$= \text{Equivalent weight of Polymers} = \frac{\text{grams}}{\text{NCO group}}$$

If the prepolymer is a diisocyanate, the molecular weight is two times the Isocyanate Equivalent.

Example 7—Curing of prepolymer with MDI·2HCN

The prepolymer of Example 6 was cured with MDI·2 HCN using 2-picoline and triethylamine as a catalyst. A mixture of 39.4 g. (0.005 mol) of the prepolymer and 1.5 g. (.005 mol) of MDI·2HCN was prepared without a solvent. To the mixture 1 g. of 2-picoline was added. A very slow reaction resulted, and the temperature increased from 26° C. to only 28° C.

After 30 minutes, 1 ml. of triethylamine was added. The temperature immediately rose to 78° C., evidencing a rapid reaction. The reaction mass was heated in vacuo (10 mm. of Hg) for 2 hours at 100° C. to complete the curing of the polyurethane. A rubbery mass was recovered. This example illustrates that 2-picoline is not a suitable catalyst, and that a prepolymer of moderately high NCO equivalence is satisfactory to form a tough rubber-like polyurethane when MDI·2 HCN is the curing agent.

Example 8—Curing of a prepolymer having an isocyanate equivalent of 1100, using MDI· HCN A prepolymer was prepared by reacting PPG–2025 polyol with MDI under the same conditions as Example 1 except that reactants were used in proportions to give a NCO/OH ratio of 2:1. The resultant prepolymer had an isocyanate equivalent of 1100.

The prepolymer (21.6 grams, 0.0098 mol) and MDI·2 HCN (3.4 grams, 0.01 mol) were dissolved in 100 ml. of NMP. Two milliliters of triethylamine catalyst were added. Two hours after addition of the catalyst, the polymer gelled and wrapped around the stirrer. The polymer was stirred with ice in a Waring blendor to break the product into crumbs.

The crumbs of rubbery product were suspended in 10% aqueous hydrochloric acid overnight to obtain a yield of 22 grams (92%) of hydrolyzed product which contained parabanic acid rings. When a film was pressed out at 400° F. and 2 tons per square inch pressure, it adhered strongly to the aluminum foil, suggesting its utility as an adhesive. The tensile strength (at break) was 1256 p.s.i. elongation (at break) was 600%. The following formula illustrates the general structure of the repeating units in the polymer:

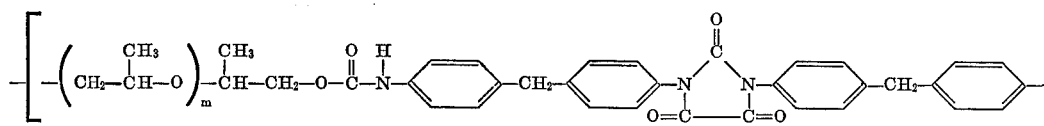
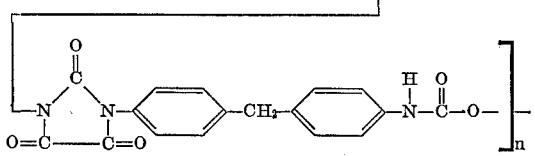

wherein
m=28–30
n=1–20

Example 9—Curing of prepolymer of Example 8 with MDI·2HCN and MDI

The prepolymer of Example 8 (0.01 mol) was cured with MDI (0.01 mol) and MDI·2HCN (0.02 mol) using 100 ml. of NMP as a solvent and two milliliters of N,N-dimethylcyclohexylamine as a catalyst. The product was poured into a 2% HCl aqueous solution, filtered and washed with water and methanol. It had a tensile strength of 3546 p.s.i. and an elongation of 500%.

Example 10—Curing of prepolymer with TDI and TDI·2-HCN

One-tenth mol of the prepolymer of Example 8 was cured with 0.1 mol of TDI (a mixture of 2,4- and 2,6-toluene diisocyanate) and 0.24 mol of TDI·2HCN (the dicyanoformamide of TDI which was prepared in a manner similar to the adduct in Example 2) using NMP as a solvent (800 ml.) and triethylamine as a catalyst (10.1 g.).

A portion of the resulting product was broken up in ice water in a blender, dissolved in acetone, and 50 ml. of formic acid slowly added. A hydrolyzed product was recovered and pressed into a clear film. The product before hydrolysis had a tensile strength at break ($T_B$) of 4080 p.s.i. and an elongation at break (E) of 700%. After hydrolysis to convert the iminoimidazolidinedione rings to parabanic acid rings, the $T_B$ was 1300 p.s.i. and the E was 110%.

Example 11—Curing of prepolymer with MDI and HCN

A prepolymer (2.28% NCO) was prepared from PPG 2025 and MDI in a manner similar to that described for Example 1. One hundred and seventy-seven grams of this prepolymer and 2 ml. of DMF (dimethylformamide) saturated with NaCN were dissolved in 420 grams of NMP. A second solution of 23.5 g. (0.09 mol) of MDI and 3.4 g. (0.12 mol) of HCN in 150 g. of NMP was also prepared. The second solution was added to the first and the temperature increased from 30° C. to 37° C. After one hour the product was precipitated in cold water. It was pale yellow-colored rubber-like material.

The above examples show that polyurethane products can be prepared by a variety of procedures, each of which incorporates an imidazolidine ring into the polymer backbone.

In the previous applications, the isocyanate was disclosed as a diisocyanate. As the preceding disclosure herein makes apparent polyisocyanates, i.e. from 2 to 15, preferably 2 to 10, and most preferably 2 to 6 isocyanate groups can be used as well as diisocyanates for the invention expressly disclosed herein as well as those disclosed by incorporation by reference. Polycyanoformamide having a number of cyano groups corresponding to the number of isocyanate groups can be prepared.

The term polyisocyanate is generic and means the component must have at least two isocyanate groups but it will be within the generic scope of the claims if more than two isocyanate groups are employed in any reactant. Thus, infringement should not be avoided merely because 3 or more isocyanate groups are used in the same process and the claim recites diisocyanate.

I claim:

1. A method of curing polyisocyanate-containing prepolymers having molecular weights of 300 to 10,000 formed by the reaction of a polymer having active hydrogens with a polyisocyanate which comprises
   (a) the step of mixing with said prepolymers a catalyst and a curing agent selected from the group consisting of:
      (i) HCN;
      (ii) HCN+polyisocyanate;
      (iii) Polycyanoformamides having a molecular weight of 40 to 2,000; and
      (iv) mixtures of the foregoing;
   (b) causing a chain extension reaction to occur between prepolymer molecules wherein connecting linkages are formed and wherein said linkages contain the heterocyclic ring

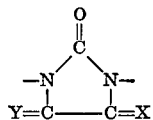

wherein X and Y are either =O or =NH but X and Y are never both =NH

2. A method according to claim 1 wherein said curing agent is HCN.

3. A method according to claim 1 wherein said curing agent is a mixture of HCN and polyisocyanate.

4. A method according to claim 1 wherein said curing agent is a polycyanoformamide.

5. A method according to claim 1 wherein said polycyanoformamide is a dicyanoformamide.

6. A method according to claim 1 wherein said prepolymer is a diisocyanate.

7. A method according to claim 5 wherein said polyisocyanate is a diisocyanate.

8. A method according to claim 1 wherein said catalyst is inorganic cyanide ion or tertiary amine.

9. A method according to claim 1 wherein said prepolymer is elastomeric.

10. A method according to claim 1 where said prepolymer is resinous.

11. A method according to claim 1 wherein said prepolymer is formed from the reaction of 2 mols of 4,4'-diphenylmethane diisocyanate and 1 mol of a propylene oxide polyether having about 30 propylene oxide repeating units.

12. A method according to claim 1 wherein said cyanoformamide was prepared by reacting 4,4'-diphenylmethane diisocyanate with HCN in the presence of a suitable catalyst.

13. A method according to claim 1 wherein said heterocyclic ring is subjected to the additional step of hydrolysis to convert said ring structure to the following heterocyclic ring structure.

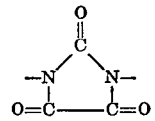

14. The composition produced by the process of claim 1.
15. The compostion produced by the process of claim 2.
16. The composition produced by the process of claim 3.
17. The composition produced by the process of claim 4.
18. The composition produced by the process of claim 5.
19. The composition produced by the process of claim 6.
20. The composition produced by the process of claim 7.
21. The composition produced by the process of claim 8.
22. The composition produced by the process of claim 9.
23. The composition produced by the process of claim 10.
24. The composition produced by the process of claim 11.
25. The composition produced by the process of claim 12.
26. The composition produced by the process of claim 13.
27. A method according to claim 5 wherein the dicyanoformamide is prepared from toluene diisocyanate.
28. A method according to claim 5 wherein the diisocyanoformamide is prepared from hexamethylene diisocyanate.
29. The composition produced by the process of claim 27.
30. The composition produced by the process of claim 28.

References Cited

Oku et al., Die Makromolecular Chemie, 78, 1964, pp. 186–193.

DONALD E. CZAJA, Primary Examiner

M. WELSH, Assistant Examiner

U.S. Cl. X.R.

260—77.5 CH